United States Patent [19]

Andrieu

[11] Patent Number: 5,336,568
[45] Date of Patent: Aug. 9, 1994

[54] DEVICE FOR OPTIMIZING THE DISCHARGE OF A LEAST TWO ELECTROCHEMICAL CELLS

[75] Inventor: Xavier Andrieu, Bretigny-sur-Orge, France

[73] Assignee: Alcatel Alsthom Compagnie General D'Electricite, Paris Cedex, France

[21] Appl. No.: 972,446
[22] PCT Filed: May 14, 1992
[86] PCT No.: PCT/FR92/00427
§ 371 Date: Jan. 15, 1993
§ 102(e) Date: Jan. 15, 1993
[87] PCT Pub. No.: WO92/21174
PCT Pub. Date: Nov. 26, 1992

[30] Foreign Application Priority Data

May 17, 1991 [FR] France ............... 91 06032

[51] Int. Cl.$^5$ .......................................... H01M 10/46
[52] U.S. Cl. ............................................ 429/7; 429/61; 320/19
[58] Field of Search .................. 429/7, 61; 320/19, 55

[56] References Cited

U.S. PATENT DOCUMENTS

| 4,297,590 | 10/1981 | Vail ........................... 320/19 X |
| 4,413,220 | 11/1983 | Waineo ........................ 320/15 |
| 5,200,686 | 4/1993 | Lee ............................ 429/7 X |

FOREIGN PATENT DOCUMENTS

| 0348983 | 1/1990 | European Pat. Off. . |
| 2605730 | 8/1977 | Fed. Rep. of Germany . |
| 3834004 | 4/1990 | Fed. Rep. of Germany . |
| 56-114290 | 9/1981 | Japan ........................... 429/61 |

Primary Examiner—Stephen Kalafut
Attorney, Agent, or Firm—Sughrue, Mion, Zinn, Macpeak & Seas

[57] ABSTRACT

The device for discharging electrochemical cells (20, 21) into a load (Rc) is of the type comprising switching means (25, 26), each cooperating with one of the electrochemical cells (20, 21), these switching means (25, 26) being controlled sequentially by a generator (23) providing N pulse trains (SC1, SC2) offset relative to one another, each electrochemical cell (20, 21) being connected to the load (Rc) for the duration of a pulse, through the switching means (25, 25) with which the cell cooperates. According to the invention, it is characterized in that the pulses of each train (SC1, SC2) have an interval of overlap with the pulses of another train (SC1, SC2), such that the load (Rc) is constantly supplied by at least one of the N electro-chemical cells (20, 21), the overlap interval being very much smaller than the duration of each of said pulses.

10 Claims, 2 Drawing Sheets

DEVICE FOR OPTIMIZING THE DISCHARGE OF A LEAST TWO ELECTROCHEMICAL CELLS

BACKGROUND OF THE INVENTION

The field of the invention is devices for optimizing the discharge of electrochemical cells. More particularly, the present invention concerns an electrochemical cell discharge device applicable when heavy currents are required to supply apparatus.

As is known, electrochemical cells are formed by two electrodes disposed in an electrolyte and they may be batteries (primary cells) or accumulators (secondary cells). They are characterized by a nominal voltage and a capacity expressed in Ah.

In conventional manner the discharge of an electrochemical cell is effected with continuous current. The capacity of a cell depends in particular on the discharge rate to which it is subjected. The capacity of a cell falls when its discharge rate increases (Peukert's law). This decrease is due to the diffusion of ions in the electrolyte and/or in the solid phases of the electrode materials under steady loading.

One consequence of a high discharge rate is the establishment of concentration gradients of electro-active species within the electrodes. This is the result of heterogeneous behavior (local over-discharge or overload) and poor use of the active materials, resulting in a lowering of the instantaneous capacity and a reduction in the working life of the electrochemical cell.

It is thus preferable to discharge an electrochemical cell in a pulsed mode in which the relaxation induced in each rest period allows the behavior of the electrodes to be homogenized.

Discharge in a pulsed mode is used especially for heavy current applications. It is thus possible to feed apparatus with the aid of switching supplies or choppers. However, the main problem with this type of supply is that the frequency at which the continuous supply voltage is chopped is too high (from some kHz to some hundreds of kHz) to allow such homogenization. It is not possible to reduce the chopping frequency too much, because of the inevitable increase in the size of the capacitors serving to smooth the chopped voltage. These capacitors usually act in conjunction with a diode and an inductance ($\pi$ network).

Increase in the size of the capacitors involves a higher cost price for the supply and can be contemplated only within certain limits and for site applications. It is thus not possible to use large capacitors in transportable apparatus of the kind for portable use (cordless drills, etc.), electric motor vehicles, radio-telephones or first aid equipment (defibrillators, etc.).

In known manner, the optimum periods of pulsed discharge are high and in the order of some seconds to some tens of seconds and at such frequencies capacitors do not exist enabling a continuous current to be obtained which is directly usable for on-board applications.

A discharge device for electrochemical cells is described in German patent application 26 05 730 in the name of Licentia Patent Verwaltungs GmbH. This device, applied for example to the discharge of two electrochemical cells in an apparatus fed by these cells, makes alternate connection of each of the electrochemical cells to the supply terminals of the apparatus. Each cell cooperates with a first terminal of switching means forming a circuit breaker, the second terminal of each switching means being connected to the supplied apparatus. The second terminals of the switching means are connected together. The switching means are controlled by digital control signals output by a pulse train generator. Each switching means is rendered conducting when a pulse is applied thereto, which causes the associated electrochemical cell to be connected to the supplied apparatus. The pulses of the two trains are interleaved (i.e., do not overlap) in time, so that the two cells will never be connected simultaneously to the apparatus. One of the trains is obtained by logical inversion of the other.

However, the presence of a maintaining capacitor connected in parallel with the supplied apparatus is essential, since the pulses of the two trains are not strictly complementary, because of the logical inversion and the delay introduced by the logical inversion. The result is that, at each switchover, there is a period of time during which neither of the cells is connected to the supplied apparatus, the maintaining capacitor taking over the function of a cell during these intervals of time. However, if the apparatus requires a heavy supply current, this capacitor likewise has to have a large capacitance. The devices described in this document are thus not suitable for on-board applications with a heavy discharge current.

SUMMARY OF THE INVENTION

An object of the present invention is to reduce these problems.

More particularly, one of the objects of the invention is to provide a device allowing the discharge of electrochemical cells in a pulsed mode, the interval of discharge being optimized to obtain maximum capacity of the electrochemical cell, without however requiring a smoothing filter or maintaining capacitor.

Another object of the invention is to provide such a device of reduced cost price.

These objects, and others which will appear below, are met by a device for discharging N electrochemical cells into a load, N being greater than or equal to 2, of the type comprising N switching means each cooperating with one of the electrochemical cells, the N switching means being controlled sequentially by a generator providing N pulse trains offset relative to one another. Each electrochemical cell is connected to the load for the duration of a pulse, through the switching means with which the cell cooperates. According to the invention, the pulses of each train have an interval of overlap with the pulses of another train, such that the load is constantly supplied by at least one of the N electrochemical cells, the overlap interval being very much smaller than the duration of each of the pulses.

The generation of trains of pulses with an interval of overlap ensures continuity of supply to the load. There is thus no interruption in the supply requiring the presence of a capacitor to maintain the voltage.

Preferably the electrochemical cells have substantially equal capacities, and the pulses have the same duration. In this case it is not necessary to introduce a current regulator between the electrochemical cells and the supplied load, or to provide means for modifying the duty cycle of the pulse trains.

In one advantageous embodiment, the switching means are formed by solid-state switches and preferably by field effect transistors. This makes it possible to do without any moving parts in the discharge device for electrochemical cells and augments its working life.

The durations of the pulses are advantageously a function of the type of electrochemical cells.

Other features of the present invention will appear from a reading of the following description of a preferred embodiment, given by way of example, without limitation, and of the accompanying drawings, in which:

BRIEF DESCRIPTION OF THE DRAWINGS

FIG. 1 shows the equivalent circuit of an electrochemical cell.

DESCRIPTION OF A PREFERRED EMBODIMENT

Figure 1:
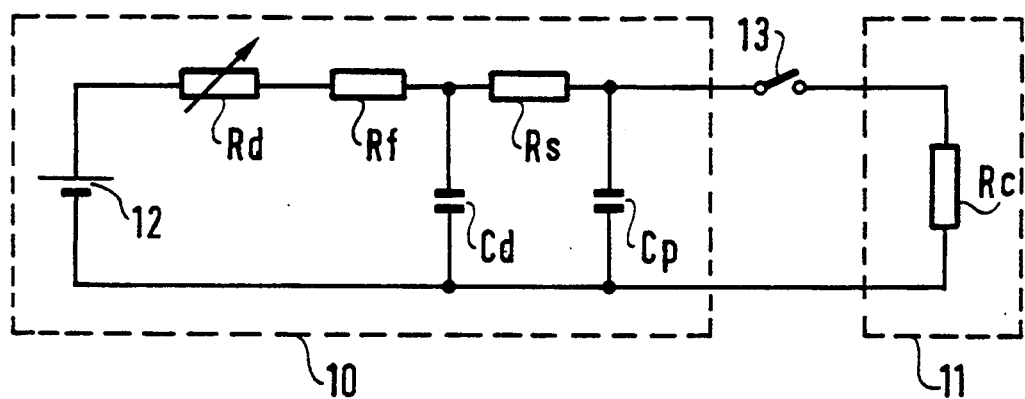
FIG. 1 shows an equivalent circuit of an electrochemical cell.

The equivalent circuit of an electrochemical cell 10 comprises a diffusion impedance Rd, a charge transfer resistance Rf, a series resistance Rs, a physical capacitance CID and a double layer capacitance Cd. The electrochemical cell 10 is connected to a load 11 through a switch 13. The load 11 is formed for example by a resistor Rc.

The physical capacitance Cp is directly related to the dielectric constant of the electrolyte and to the shape of the electrodes. The value of Cp per $cm^2$ of the apparent electrode area is generally between 10 pF and 1 nF.

The double layer capacitance corresponds to the accumulation of ions on the surface of the electrodes. The value of Cd per $cm^2$ of electrode is generally between 100 nF and 10 μf.

The series resistance Rs represents the ionic conductivity of the electrolyte and the electronic conductivity of the active substances.

The charge transfer resistance Rf depends on the electrochemical kinetics at the electrodes, that is to say on the speed of reaction between the electrodes and the electrolyte. The greater the speed of reaction, the smaller the resistance Rf.

The diffusion impedance Rd, also known as the Warburg impedance, is an impedance whose value varies as a function of the frequency of actuation of the switch 13. At low frequencies, the impedance Rd introduces a constant phase shift of 45° between the current consumed by the load 11 and the voltage at the terminals of this load. This is explained by a non-stabilized diffusion rate, the gradient of the ion concentration being delayed relative to the electrical stress. There thus results a negative phase shift of capacitive type. The diffusion impedance Rd can thus equally be represented by a capacitance; (it is generally denoted by the letter W).

Since the establishment of the concentration gradient and its relaxation are essentially dissipative, it is possible to represent the diffusion impedance Rd by a resistance which varies as a function of the frequency, the strength of the current supplied, and the state of the cell.

The capacitive phase shift can appear with an electrode with volume porosity and/or with a solid electrode of low internal ionic conductivity (relative to the ionic conductivity of the external electrolyte). The same behavior can appear also in a porous capacitive structure without diffusion (resistance/capacitance network of low-pass type of quasi-infinite order).

Optimization of the electrical output of an electrochemical cell thus consists in reducing as much as possible the internal resistance of the cell, formed by the sum of Rs, Rf and Rd.

For the sake of simplicity Rs and Rf can be considered constant. Limiting the losses under heavy load thus consists in minimizing Rd and phase shift.

The continuous discharge mode is the most unfavorable because Rd is maximum, with periodic current, reduction in Rd is possible but the frequency of actuation of the switch 13 must not be too high. Rs and Cd effectively form a low-pass filter (Cp is negligible compared with Cd) and the cell will only be subjected to continuous current if the frequency of operation is too high.

Figure 2:
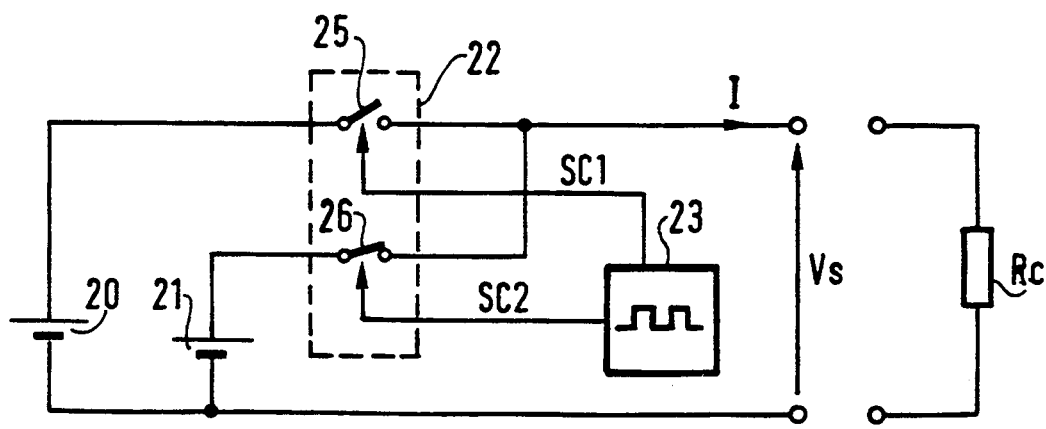
FIG. 2 shows a preferred embodiment of the device of the invention.

FIG. 2 shows a preferred embodiment of the device of the invention.

This embodiment consists in connecting two electrochemical cells 20, 21 to a switching unit 22, and in controlling this unit 22 in such a way that one electrochemical cell provides current while the other is resting or relaxing. The illustrated application consists in discharging the cells 20 and 21 alternately through a load resistor Rc.

Control over the switching unit 22 is effected by a generator 23 of pulse trains SC1 and SC2 having a cycle or period.

The switching unit 22 is formed for example by solid state switches 25 and 26 forming switching means. The negative terminals of the cells 20 and 21 are connected together and each of the positive terminals is connected to one switch 25, 26.

Figure 3:
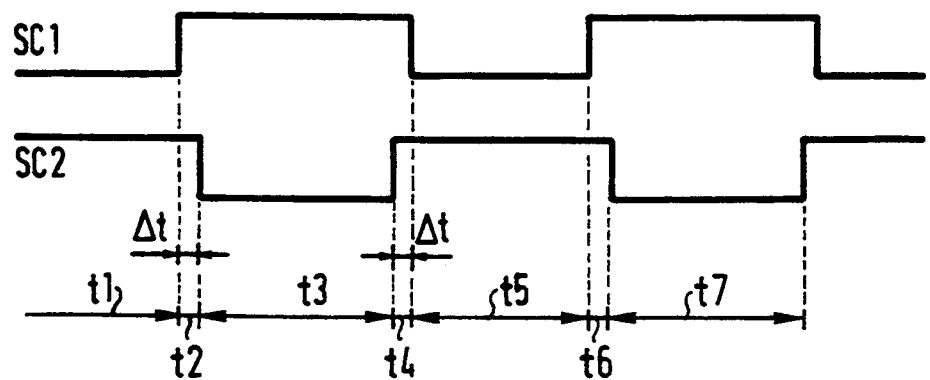
FIG. 3 shows the pulse trains SC1 and SC2 of FIG. 2.

The pulse train generator 23 controls the switches 25 and 26 in such a way that except for a very short overlap interval, when the switch 25 is closed, the switch 26 is opened and vice versa. Thus, as shown in FIG. 3, each pulse of a pulse train SC1, SC2 has an interval of overlap with a pulse of the other train, at the changeover point, such that the load Rc is supplied constantly by at least one of the electrochemical cells.

The illustrated intervals of time t1 to t7 delimit the intervals of time of the trains SC1 and SC2. When one of these trains has a high level, the switching means which it controls connects the associated electrochemical cell to the load Rc. Thus, only the electrochemical cell 20 is connected to the load Rc through the switching means 25 during the intervals t3 and t7, and is disconnected from the load during the intervals t1 and t5. Conversely, only the electrochemical cell 21 is connected to the load Rc through the switching means 26 during the intervals t1 and t5, and is disconnected from the load during the intervals t3 and t7. Moreover, the trains SC1 and SC2 have intervals of overlap t2, t4 and t6, during which the cells 20 and 21 are both connected to the load Rc. The overlap intervals have a short duration Δt, such as to ensure continuity of supply of the load Rc. Each switching means thus effects connection to the load Rc of the electrochemical cell with which it cooperates during an interval tx+2Δt, where Δt=t2, t4, t6..., and tx=t3, t7, t1, t5..., so that each cell is disconnected, and thereby relaxes, for an entire interval tx which is substantially equal to an entire pulse duration which in turn is equal to one-half (T/2) of the cycle or period T. The durations Δt are very short, (i.e., as illustrated in FIG. 3, substantially less than one-half of a pulse duration) the action of the overlap being restricted in order to ensure that the connections of the electrochemical cells 20 and 21 to the load Rc join up in such a way as to avoid tiny interruptions in the supply and thus to avoid the use of a maintaining capacitor, of large size for heavy current applications. Continuous progression of the trains SC1 and SC2 thus makes it possible to ensure both an un-interrupted supply for the load Rc and cyclic relaxation for each electrochemical cell.

The current I taken by the load Rc is constant if the electrochemical cells 20 and 21 are of the same size. Each electrochemical cell 20, 21 provides the current I alternately to the load Rc and each is drained by a current substantially equal to $\frac{1}{2}$ during the interval $\Delta t$. A constant current I allows direct supply of a load Rc which may be a device of the nature of a radio-telephone, a motor of a portable tool (drill, screwdriver, etc.) medical apparatus (defibrillator, etc.) or any other apparatus requiring use of an on-board supply (electric vehicle).

If the electrochemical cells 20, 21 are not of the same kind (lithium, lead-acid, etc.) or if their sizes are different, the current I can exhibit certain fluctuations. In some applications (especially supplying motors), slight fluctuation in the supply current does not affect proper operation of the supplied apparatus. However, if the supply is applied to an apparatus which is more sensitive to variations in the supply current, it is necessary to insert a current regulator between this apparatus and the discharge device of the invention. Another expedient with an appreciable difference in the sizes of the electrochemical cells is to modify the duty cycles of the control signals for the switches 25, 26. It is possible thus to compensate for the difference in sizes.

In a preferred embodiment of the invention, the switches 25 and 26 are solid state switches. They can for example be formed by field-effect transistors of power MOSFET type. Such a component has the advantage of a very low resistance between the drain and the source when it is conductive.

It is obviously possible to increase the number of electrochemical cells to provide a greater capacity. The number of switching means should then be increased to correspond and the configuration of the control signals for the switches has to be modified. The pulse train generator 23 can be formed by an integrated circuit fed by the voltage Vs available at the terminals of the load Rc.

The electrochemical cells 20 and 21 can equally be secondary or primary cells. It is however preferable to select devices of the same type and of the same size to avoid addition of a current regulator. If the types and sizes of the electrochemical cells are the same, the durations of the pulses of the trains SC1 and SC2 are identical.

Figure 4:
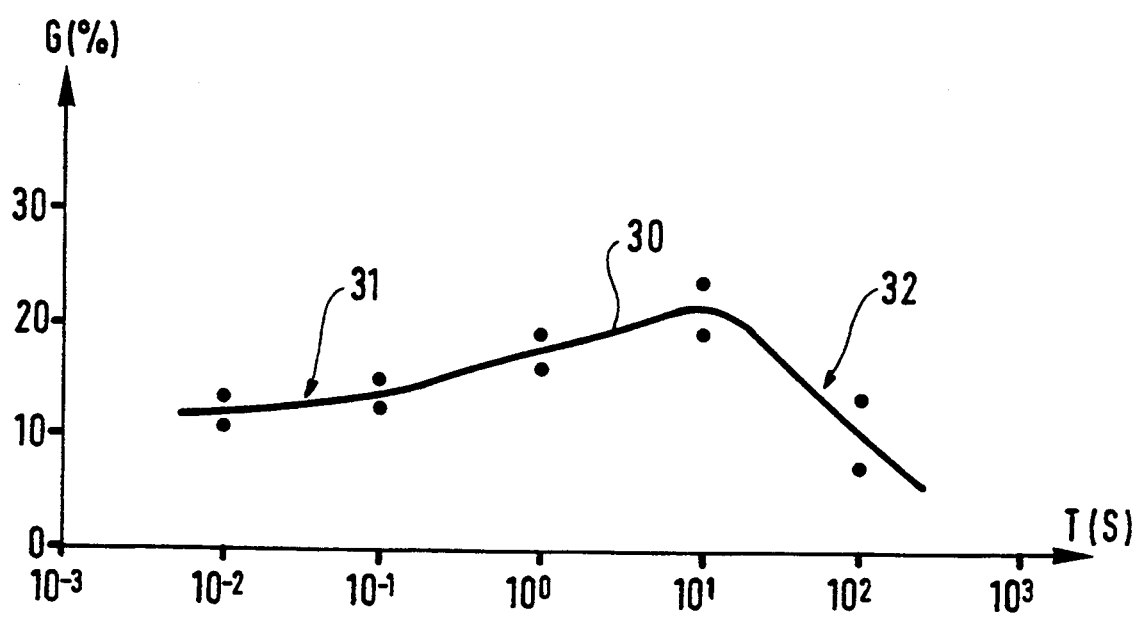
FIG. 4 shows the gain in capacity of two electrochemical cells, this gain being obtained as a function of the periods of the pulse trains of FIG. 3.

The factor ensuring good results from the device of the invention is the interval of actuation of the switches 25 and 26 as shown in FIG. 4.

FIG. 4 shows the gain in capacity of two electrochemical cells obtained as a function of the period of the pulse trains of FIG. 3.

The curve 30 shows the gain in capacity G in % obtained by the set-up of FIG. 2 for five sets of similar electrochemical cells, as a function of the period of actuation of the switches 25 and 26. The electrochemical cells used were alkaline $Zn/MnO_2$ primary cells of size R6, from the same manufacturing lot. Four more of these cells enabled their mean capacity to be measured under continuous current, with a discharge current of 100 mA. The mean capacity obtained was 2.05 Ah per device. This value corresponds to the value 0 on the ordinate.

Each set of two primary cells was then used in the set-up of FIG. 2, for a given interval of actuation of the switches 25 and 26 and for a periodic current of 200 mA. The control signals of the switches had a duty ratio close to 1 and the mean current drawn from each cell was thus equal to 100 mA. The capacities were measured and plotted on FIG. 4.

A very distinct increase in the capacity of the electrochemical cells is noted. For an interval of actuation of each switch of 5 seconds, that is to say for a total period of 10 seconds, an increase in the capacity in excess of 20% is observed (2.5 Ah instead of 2.05 Ah with continuous current).

The optimum period of actuation depends on the type of electrochemical cell which is used. The curve 30 shows a reduction in gain in capacity beyond its maximum (T=10s).

The fall-off 32 is due to the low-pass filter formed by Rs and Cd (FIG. 1).

When the frequency becomes too great (fall-off 31), the filter formed by Rs and Cd smooths the signal and the voltage generator 12 (FIG. 1) is subjected to a continuous discharge only and the gain in capacity falls of rapidly.

The period of the control trains is thus preferably between 5 and 50 seconds and may with advantage be 10 seconds.

The instantaneous capacity and the total capacity (length of life of the cell) are improved. The relaxation provided in each period allows the behavior of the volume electrodes to homogenize. If the sizes of the electrochemical cells are not substantially equal, compensation for the difference is size is effected by modifying the frequency of actuation of the switches and/or the duty cycle of the control signals of the switches.

Obviously the device of the invention is especially applicable for large currents and for cells whose behavior is sensitive to the current density. It is applied advantageously to electrochemical cells whose capacity falls off substantially with the discharge rate. For example, the invention makes possible gains in capacity greater for lead-acid electrochemical cells than for nickel-cadmium cells.

Since Rd depends on the concentration gradient, the electrochemical cell should comprise at least one volume electrode. The device of the invention is applicable equally to electrodes in the form of plates (2 dimensions) but the gain in capacity is then smaller.

The device of the invention thus allows a large gain in capacity to be obtained and, for an equal final capacity, it allows the use of electrochemical cells of reduced size. There is an improvement in bulk and weight of 20% for equal capacity.

The invention thus equally provides a solution to the bulk and weight of electrochemical cells actually used in portable apparatuses or in electric vehicles.

The present invention is equally applicable to loads of capacitive or inductive type and allows an increase in the length of life of electrochemical cells.

I claim:

1. A device for discharging N electrochemical cells (20, 21) into a load (Rc), N being greater than or equal to 2, said device comprising: N switching means (25, 26)

each for cooperating with a different one of said electrochemical cells (20, 21); said N switching means (25, 26) being controlled sequentially by a generator (23) providing N pulse trains (SC1, SC2) which are offset relative to one another and which have a period T, each electrochemical cell (20, 21) being connectable to said load (Rc) for the duration of a pulse, through the switching means (25, 26) with which the cell cooperates, wherein the pulses of each train (SC1, SC2) have an interval of overlap (Δt) with the pulses of another train (SC1, SC2), such that said load (Rc) is constantly supplied by at least one of said N electrochemical cells (20, 21) said overlap interval (Δt) being smaller than the duration of each of said pulses, and such that each cell is disconnected from said load (Rc) for substantially said duration (T/2) of a pulse, said load being supplied by only two said electrochemical cells during said overlap interval.

2. A device according to claim 1, characterized in that said electrochemical cells (20, 21) have substantially equal capacities and in that said pulses have the same durations (t1, t3, t5, t7).

3. A device according to claim 1, characterized in that said switching means (25, 26) are solid state switches.

4. A device according to claim 1, characterized in that said switching means (25, 26) are field effect transistors.

5. A device according to claim 1, characterized in that the durations (t1, t3, t5, t7) of said pulses are a function of the type of said electrochemical cells (20, 21).

6. The device according to claim 1, wherein each of said pulse trains has a period of between 5 to 50 seconds.

7. The device according to claim 6, wherein said period is 10 seconds, and wherein said duration of a pulse is 5 seconds.

8. The device according to claim 1, wherein there are only two of said cells.

9. The device according to claim 1, wherein said electrochemical cells (20, 21) are connected to respective inputs of said switching means (25, 26).

10. The device according to claim 1, wherein said load (Rc) is connected to respective outputs of said switching means (25, 26).

* * * * *